United States Patent [19]
Mueller et al.

[11] Patent Number: 6,089,076
[45] Date of Patent: Jul. 18, 2000

[54] SYSTEM TO CONTROL THE POWER OF A BEAM

[75] Inventors: Eric R. Mueller, West Suffield; Richard A. Hart, North Granby; William A. Veronesi, Hartford; Frederick T. Olender, Somers, all of Conn.

[73] Assignees: United Technologies Corporation, Hartford; DeMaria ElectroOptics Systems, Inc., Bloomfield, both of Conn.

[21] Appl. No.: 09/156,338

[22] Filed: Sep. 18, 1998

[51] Int. Cl.[7] .............................. G01J 5/02; G01M 3/16
[52] U.S. Cl. .................. 73/24.06; 73/24.02; 73/40.5 A; 73/40.7; 250/339.01; 250/339.06; 250/339.12; 250/339.3; 250/343; 356/432; 356/437
[58] Field of Search ............................ 73/24.01, 24.02, 73/24.06, 40.5 A, 40.7; 250/339.01, 339.06, 339.12, 339.13, 343; 356/432, 437

[56] References Cited

U.S. PATENT DOCUMENTS

| | | |
|---|---|---|
| 2,449,166 | 9/1948 | Herschberger . |
| 3,925,666 | 12/1975 | Allan et al. .............................. 250/338 |
| 4,163,382 | 8/1979 | Amer . |
| 4,172,382 | 10/1979 | Murphy et al. ....................... 73/40.5 A |
| 4,372,149 | 2/1983 | Zharov . |
| 4,394,573 | 7/1983 | Correa et al. . |
| 4,412,445 | 11/1983 | Spellicy . |
| 4,457,162 | 7/1984 | Rush et al. . |
| 4,516,858 | 5/1985 | Gelbwachs ............................. 356/437 |
| 4,555,627 | 11/1985 | McRae, Jr. . |
| 4,622,845 | 11/1986 | Ryan et al. ................................. 73/24 |
| 4,635,042 | 1/1987 | Andrews . |
| 4,743,119 | 5/1988 | Ida . |
| 4,772,789 | 9/1988 | Maram et al. ........................... 250/330 |
| 4,785,659 | 11/1988 | Rose et al. . |
| 4,822,168 | 4/1989 | Nogami et al. . |
| 5,002,391 | 3/1991 | Wolfrum et al. . |
| 5,103,675 | 4/1992 | Komninos . |
| 5,129,255 | 7/1992 | Corbin . |
| 5,153,672 | 10/1992 | Globig et al. ....................... 356/432 X |
| 5,161,408 | 11/1992 | McRae et al. ............................ 73/40.7 |

(List continued on next page.)

OTHER PUBLICATIONS

"A Toxic Gas Monitor with ppb Sensitivity Using an Automated Laser Optoacoustic Spectrometer", Laser & Elektro–Optik, vol. 11, No. 02, 1979, pp. 18–19.

West, G. A. et al., "Photoacoustic Spectroscopy", Rev. Sci. Instrum., vol. 54, No. 07, Jul. 1983, pp. 797–817.

Isomet Corp., "All About Bragg Angle Errors in Acousto–Optic Modulators & Deflectors." Springfield, VA, AN772A, May 1993, pp. i–23.

Lekavich, John "Basics of Acousto–Optic Devices—Acousto–Optic Beam Modulators and Deflectors Control Laserbeams in Many Applications." Lasers & Applications, Apr. 1986, pp. 59–64.

Laser Imaging Systems, "LaserSonic LSA–3." Punta Gorda, FL, 2 pages.

Photonics Spectra, Apr. 1994, "Laser Applications," Assembly–Line Leak Testing, p. 114.

Brassington, D. J., "Photo–acoustic detection and ranging—a new technique for the remote detection of gases." J. Phys. D: Appl. Phys., 15 (1982), pp. 219–228.

Allen, Jr., John E. et al., "Optoacoustic pulses in a flame." Optics Letters, vol. 1, No. 4, Oct. 1977, pp. 118–120.

*Primary Examiner*—Daniel S. Larkin
*Attorney, Agent, or Firm*—Brian D. Lefort

[57] ABSTRACT

The present invention is a system for controlling the power level of a beam exiting an acousto-optic cell and/or a beam delivery device. A beam detector senses the power level of the beam and produces a power signal indicative thereof. An error detector compares the power signal to a predetermined power level. If the power signal and predetermined power level differ, the error amplifier emits a correction signal to a variable amplitude source, which adjusts the amplitude of the acoustic drive frequency such that the power level of the beam exiting the acousto-optic cell and/or the beam delivery device is substantially equal to the predetermined power level.

34 Claims, 5 Drawing Sheets

U.S. PATENT DOCUMENTS

| | | |
|---|---|---|
| 5,296,843 | 3/1994 | Wohlstein et al. . |
| 5,450,193 | 9/1995 | Carlsen et al. . |
| 5,581,017 | 12/1996 | Bejtlich, III . |
| 5,616,826 | 4/1997 | Pellaux et al. . |
| 5,780,724 | 7/1998 | Olender et al. ............ 73/40.5 A |
| 5,824,884 | 10/1998 | Olender et al. ............ 73/40.5 A |
| 5,834,632 | 10/1998 | Olender et al. ............ 73/40.7 |

SYSTEM TO CONTROL THE POWER OF A BEAM

CROSS REFERENCE TO RELATED APPLICATIONS

Copending U.S. patent application, Ser. No. 09/157235, entitled "Method and Apparatus to Diffract Multiple Beams", filed contemporaneously herewith, contains subject matter related to the disclosure herein.

This invention was made with United States Government support under contract number 70NANB5H1122, awarded by the National Institute of Standards and Technology. The Government has certain rights in this invention.

TECHNICAL FIELD

This invention relates to a system for controlling the power of a beam and more particularly for controlling the power of a beam exiting a beam delivery device.

BACKGROUND ART

Leak testing of various components (or systems) which are required to be gas-tight or liquid-tight, such as heat exchanger coils, fuel tanks, pressure vessels, fuel or hydraulic lines, etc., is a common step in the manufacturing process of such components. It is known in the art of leak testing to detect various structural flaws in components, such as leaky joints, cracks, porosity, and the like, by pressurizing the component with a gas and detecting trace quantities of the gas leaking from such components.

One way to detect such leaking gas is to use a known "photo-acoustic" effect. The photo-acoustic effect, as is known, occurs when the gas absorbs a beam of light having a particular wavelength. When the gas absorbs such a beam, the absorbed optical energy heats the gas, thereby causing it to expand. As the heated gas expands, it produces pressure or acoustic waves (i.e., sound) which propagate from the point of heating. An acoustic sensor, such as a microphone, detects the acoustic waves and produces an electrical signal indicative of the acoustic waves.

The electrical signal may also represent acoustic waves produced from background noise, which is generated by two distinct sources. The first source of background noise is the component. When the component being tested absorbs the beam energy, the component produces background noise in the form of an acoustic wave. The second source of acoustic background noise is the surrounding environment such as machinery, passing vehicles, compressed air, etc. As discussed in pending U.S. patent application Ser. No. 08/835, 043, now U.S. Pat. No. 5,834,632, a second beam can be used to generate a baseline acoustic signal indicative of the acoustic background noise. The second beam, having a wavelength, which the leaking gas does not absorb, scans the component. The acoustic sensor detects and delivers an electrical signal indicative of the background noise to a processor, which also receives an electrical signal indicative of the acoustic wave produced by the gas and the background noise. The processor then subtracts the baseline acoustic signal from the electrical signal generated by the first beam yielding a signal indicative of only the leaking gas.

The comparative acoustic signals are produced by contacting the same point on the component with alternating first and second beams. The sensitivity of the leak detection system is proportional to the rate at which the comparative acoustic signals are produced, which, in turn, is a function of the rate at which the first and second beams alternatively contact the point under test. The comparison rate of the electrical signals generated by the first and second beams, however, limits the sensitivity of the leak detection system since the comparison rate is restrained by the rate at which the alternating first and second beams are produced. Existing switching techniques used to produce alternating first and second beams utilize the mechanical movement of numerous components, such as multiple mirrors, beam combiners, etc., thereby demanding excess space and increased cost. Relying upon the mechanical movement of the above mentioned components to produce alternating beams, thereby limits the production of alternating first and second beams to about 100 HZ. The rate of mechanical switching does not ensure that the first and second beams contact the same point on the component. Specifically, it is possible that the component or device directing the first and second beams may move between the alternating cycle, thereby allowing one of the alternating beams to contact a different point on the component which decreases the accuracy of the leak detection system. Although existing switching techniques may be used to alternate the first and second beams, the existing switching techniques are limited in speed to a rate of mechanical switching, thereby decreasing the sensitivity and accuracy of the leak detection system.

Existing switching techniques also fail to produce acoustic signals truly indicative of (1) the background noise and (2) the acoustic wave produced by the gas and the background noise. Without such accurate acoustic signals, the sensitivity of the leak detection decreases.

DISCLOSURE OF INVENTION

Objects of the present invention include provisions for controlling the power level of a beam being diffracted by an acousto-optic cell by adjusting of the amplitude of the acoustic drive frequency of the acousto-optic cell.

Another object of the present invention includes provisions for a controlling the power level of multiple beams, having different wavelengths, being diffracted by a single acousto-optic cell and alternately exiting such cell by adjusting the amplitude of the corresponding acoustic drive frequency of the acousto-optic cell.

Accordingly, the method of controlling the power level of a beam exiting an acousto-optic cell includes the steps of introducing a beam to an acousto-optic cell, introducing a frequency signal to the acousto-optic cell such that the acousto-optic cell diffracts the beam at a predetermined angle, measuring the power level of such beam, comparing the measured power level to a predetermined power level, and adjusting the amplitude of the frequency signal such that the acousto-optic cell operates at an acoustic drive frequency which causes the acousto-optic cell to diffract the beam at the predetermined angle and predetermined power level.

Employing the present invention within a photo-acoustic leak detection system produces alternating multiple beams having different wavelengths and constant power levels, thereby creating respective acoustic signals truly indicative of the background noise and the background noise coupled with the additional acoustic signal caused by the leaking. Although designed originally for use in a leak detection system, the present invention may be used in a wide variety of applications.

The foregoing and other objects, features and advantages of the present invention will become more apparent in light of the following detailed description of exemplary embodiments thereof as illustrated in the accompanying drawings.

BEST MODE FOR CARRYING OUT THE INVENTION

Figure 1:
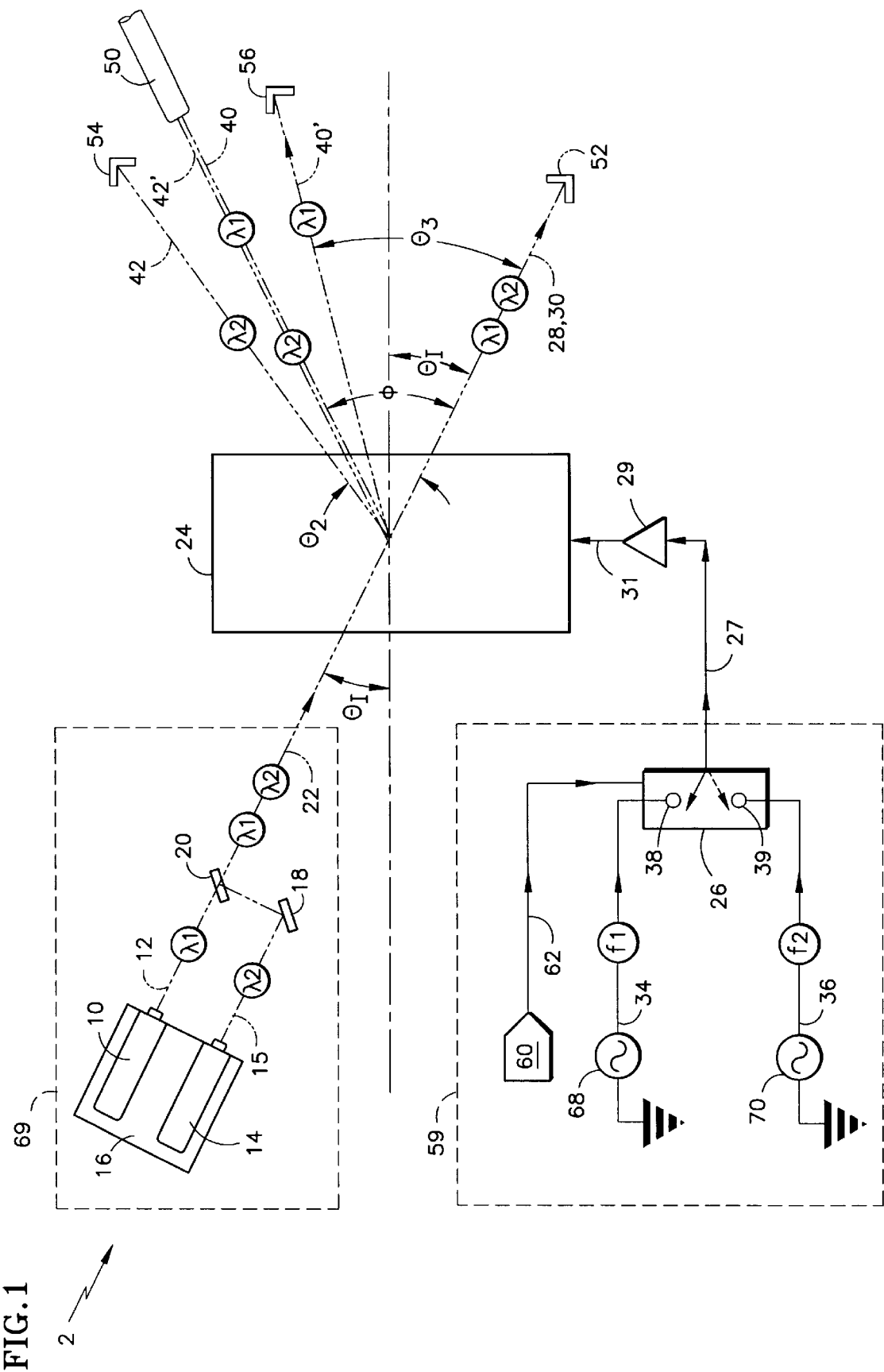
FIG. 1 is a schematic diagram of the apparatus of the present invention for diffracting multiple beams.

Referring to FIG. 1, a multiple beam diffracting apparatus 2 comprises an acousto-optic cell 24, a coincident beam source 69, and a signal controlling apparatus 59.

Figure 2:
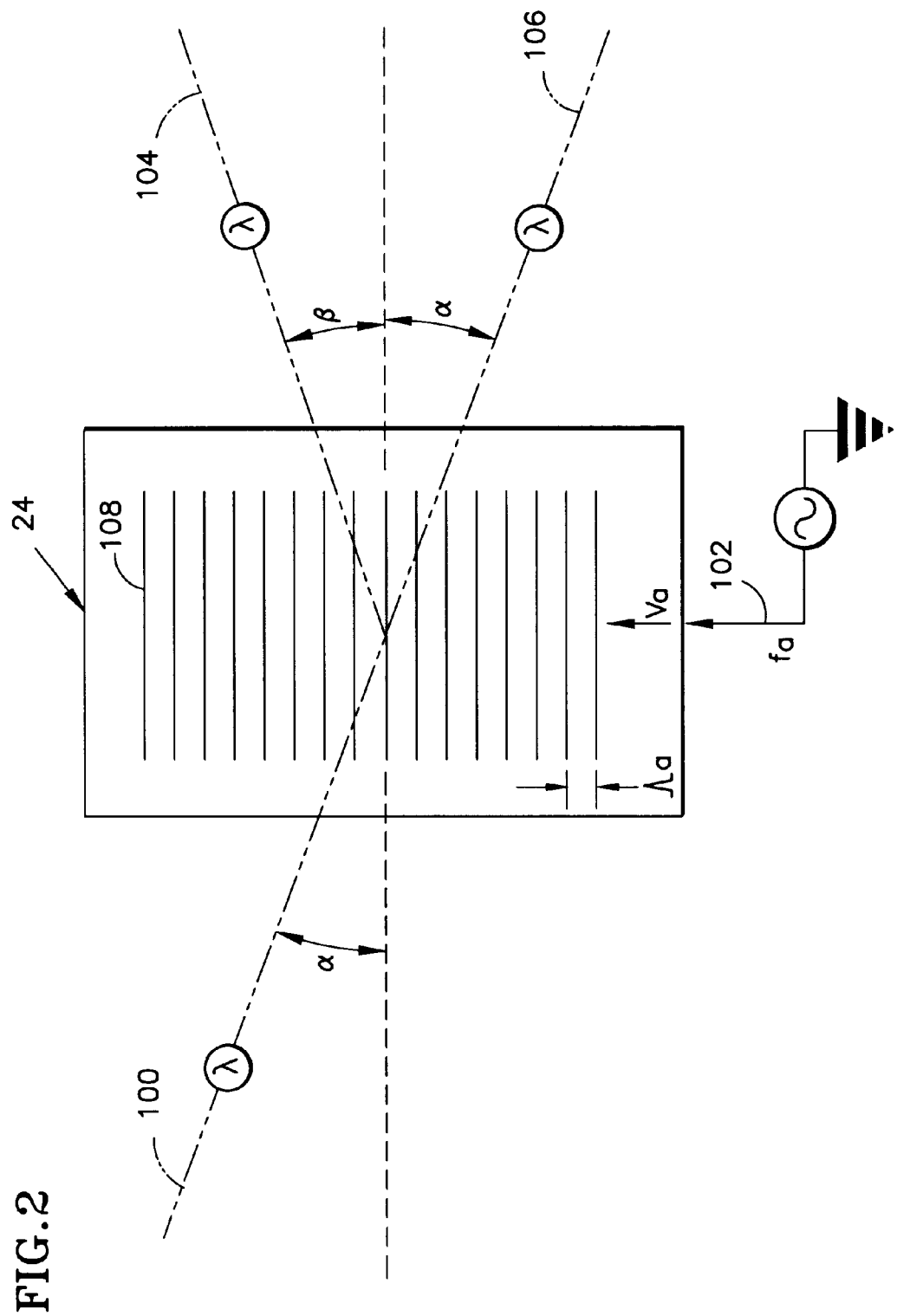
FIG. 2 is a schematic diagram of a single acousto-optic cell diffracting a beam.

The cell 24 is best understood with reference to FIG. 2. The acousto-optic cell 24 has a single beam 100 incident thereon and receives a signal 102 having a frequency ($f_a$) which is the acoustic drive frequency of the cell 24. The signal 102 creates acoustic waves, illustrated by a series of equally spaced lines 108, thereby creating a diffraction grating within the acousto-optic cell 24. The distance between the lines 108 is the acoustic wavelength ($\Lambda_a$) of the acousto-optic cell 24. The acoustic wavelength ($\Lambda_a$) is a function of the acoustic velocity ($V_a$) and the acoustic drive frequency ($f_a$) of the acousto-optic cell 24. Specifically, the acoustic wavelength ($\Lambda_a$) can be expressed according to the following formula:

$$\Lambda_a = \frac{V_a}{f_a} \qquad \text{Eq. 1}$$

where,
$V_a$=acoustic velocity
$f_a$=acoustic drive frequency

The acoustic velocity ($V_a$) of the acousto-optic cell 24 is a function of the material from which the acousto-optic cell 24 is constructed. Possible materials may include germanium, fused quartz, dense flint glass, gallium phosphide, lithium niobate, lead molybdate, and tellurium dioxide, among others. For example, Model AGM-406B21, manufactured by IntraAction Corporation, is constructed of Germanium and has an acoustic velocity ($V_a$) of about 5.5 mm/μs. With the acoustic velocity ($V_a$) constant, the acoustic drive frequency ($f_a$) and the acoustic wavelength ($\Lambda_a$) are inversely related. Hence, altering the acoustic drive frequency ($f_a$) alters the acoustic wavelength ($\Lambda_a$), thereby changing the spacing between the waves forming the grating.

While operating at the acoustic drive frequency ($f_a$) the acousto-optic cell 24 diffracts a beam 100, having a wavelength (λ), incident thereon, at an angle (α), into a first order beam 104 and a zero order beam 106. The zero order beam 106 exits the acousto-optic cell 24 at angle (α), and the first order beam 104 exits the acousto-optic cell 24 at angle (β). The power level of the first order beam 104 is a function the angle (α) at which the beam 100 enters the acousto-optic cell 24. The power level of the first order beam 104 is greatest when the beam 100 enters the acousto-optic cell 24 at the Bragg angle ($\theta_B$). Therefore, when attempting to maximize the power level of the first order beam 104, it is preferred that the beam 100 enter the acousto-optic cell 24 at the Bragg angle ($\theta_B$). When the beam 100 enters the acousto-optic cell 24 at the Bragg angle ($\theta_B$), the first order beam 104 exits the acousto-optic cell 24 at an angle equal to twice the Bragg angle ($\theta_B$) relative to the zero order beam 106. In other words, when the angle (α) is equal to the Bragg angle ($\theta_B$), the sum of angle (α) and angle (β) is equal to twice the Bragg angle ($\theta_B$).

The Bragg angle ($\theta_B$) can be expressed in the following formula:

$$\theta_B \cong \frac{\lambda}{2\Lambda_a} \qquad \text{Eq. 2}$$

where,
$\theta_B$=Bragg angle
λ=beam wavelength
$\Lambda_a$=acoustic wavelength of the acousto-optic cell Replacing the acoustic wavelength ($\Lambda_a$) in Eq. 2 with its formulaic equation in Eq. 1 produces the following Bragg angle ($\theta_B$) formula:

$$\theta_B \cong \frac{\lambda f_a}{2V_a} \qquad \text{Eq. 3}$$

The Bragg angle ($\theta_B$) is, therefore, a function of beam wavelength (λ), acoustic velocity ($V_a$), and acoustic drive frequency ($f_a$). With the acoustic velocity ($V_a$) and acoustic drive frequency ($f_a$) held constant, the Bragg angle ($\theta_B$) differs for beams having different wavelengths. Therefore, when two beams having different wavelengths are coincident on an acousto-optic cell 24, the angles at which the first order beams exit the acousto-optic cell 24 differ.

It has been discovered that an acousto-optic cell 24 can alternately diffract multiple beams at the same angle by supplying the acousto-optic cell 24 with selected signals such that the frequency of the signal causes the acousto-optic cell 24 to diffract one of the multiple beams at a predetermined angle. It is preferred that the Bragg angle ($\theta_B$) of each of the multiple beams approximate each other in order to maximize the power level of the first order beams exiting the acousto-optic cell 24. It is also preferred that each of the multiple beams contact the acousto-optic cell 24 at a common point and common angle. One method of ensuring that each beam contacts the acousto-optic cell 24 at a common point and common angle is to create a coincident beam.

Referring back to FIG. 1, the coincident beam source 69 comprises a first laser 10, a second laser 14 and a means for combining the multiple beams. The first laser 10 produces a first beam 12, having a first wavelength ($\lambda_1$) which is incident on a beam combiner 20. The second laser 14 produces a second beam 15, having a second wavelength ($\lambda_2$), which is incident on a mirror 18. In lieu of using individual discrete lasers to produce multiple beams having different wavelengths, a dual laser 16 could be used. The mirror 18 reflects the beam 15 toward the beam combiner 20 which combines the first beam 12 and the second beam 15 into a coincident beam 22. Although the coincident beam 22 actually consists of two (2) beams (i.e., the first beam 12 and the second beam 15), the coincident beam 22 appears as one beam because both the first and second beams 12, 15 occupy the same space at the same time.

The coincident beam 22 contacts the acousto-optic cell 24, capable of operating at a range of acoustic frequencies, at a coincident angle (θI). The acoustic drive frequency ($f_a$) at which the acousto-optic cell 24 operates is equal to the frequency of the signal supplied by a signal controlling apparatus 59. The signal controlling apparatus 59 comprises a switch 26, a first signal controller 68 and a second signal controller 70. The first signal controller 68, such as a crystal control oscillator, emits a first signal, having a first frequency ($f_1$), along line 34 to the switch 26. The second signal controller 70 emits a second signal, having a second frequency ($f_2$), along line 36 to the switch 26. The switch 26 has a first position 38 and a second position 39. When the switch 26 is in the first position 38, the switch 26 emits the first signal along line 27, and when the switch 26 is in the second position 39, the switch 26 emits the second signal along line 27. A radio frequency (RF) amplifier 29 increases the amplitude (i.e., power level) of the first and second signals being introduced thereto along line 27 and emits an acoustic drive signal along line 31 to the acousto-optic cell 24. The acoustic drive signal is equal to the first or second frequency ($f_1$), ($f_2$), depending upon the position of the switch 26, and becomes the acoustic drive frequency ($f_a$) of the acousto-optic cell 24. Specifically, when the switch 26 is in the first position 38, the acoustic drive frequency ($f_a$) of the acousto-optic cell 24 is equal to the frequency of the first signal, and when the switch 26 is in the second position 39, the acoustic drive frequency ($f_a$) is equal to the frequency of the second signal. Although an amplifier 29 is not a necessary component of the present invention, incorporating an amplifier 29 between the signal controlling apparatus 59 and the acousto-optic cell 24 allows the use of lower level signals within the frequency alternating device 59.

When the switch 26 is in the first position 38, the acousto-optic cell 24 diffracts the first beam 12 into a first wavelength, zero order beam 28 and a first wavelength, first order beam 40. The first wavelength, zero order beam 28 exits the acousto-optic cell 24 at the coincident angle ($θ_I$) and contacts a beam absorber 52. The first wavelength, first order beam 40, however, exits the acousto-optic cell 24 at a predetermined angle (φ). While the switch 26 remains in the first position 38, the acousto-optic cell 24 diffracts the second wavelength ($λ_2$) into a second wavelength, zero order beam 30 and a second wavelength, first order beam 42. The second wavelength, zero order beam 30 exits the acousto-optic cell 24 at the coincident angle ($θ_I$) while the second wavelength, first order beam 42 exits the acousto-optic cell 24 at a second angle ($θ_2$). The beam absorber 52 absorbs the second wavelength, zero order beam 30, and another beam absorber 54 absorbs the second wavelength, first order beam 42. For example, when the switch 26 is in the first position 38, the acousto-optic cell 24 (Model AGM-406B21, manufactured by IntraAction Corporation) operating at a first frequency ($f_1$) of about 46 MHz, diffracts the first wavelength ($λ_1$) of 9.07 μm into a first wavelength, first order beam 40 at an angle of about 0.0759 radians (about 4.35 degrees). The acousto-optic cell 24 also diffracts the second wavelength ($λ_2$) of 10.55 μm into a second wavelength, first order beam 42 at an second angle ($θ_2$) of about 0.0882 radians (about 5.06 degrees).

When the position of the switch 26 is changed from the first position 38 to the second position 39, the first wavelength and second wavelength zero order beams 28, 30 continue to exit the acousto-optic cell 24 at the coincident angle ($θ_I$). However, the acousto-optic cell 24 diffracts the second wavelength, first order beam 42' at the predetermined angle (φ) and diffracts the first wavelength, first order beam 40' at a third angle ($θ_3$). Changing the position of the switch 26 to the second position 39 changes the acoustic drive frequency ($f_a$) to the frequency of the second signal and moves the second wavelength, first order beam 42' from the second angle ($θ_2$) to the predetermined angle (φ).

The frequency ($f_2$) of the second signal is a function of the frequency ($f_1$) of the first signal. Equating the angle at which the first wavelength, first order beam 40 exits the acousto-optic cell 24, when operating at a first frequency ($f_1$), to the angle at which the second wavelength, first order beam 42 exits the acousto-optic cell 24, when operating at the second frequency ($f_2$), and equating each angle to the predetermined angle (φ) produces the following equation.

$$\frac{\lambda_1 f_1}{2V_a} = \frac{\lambda_2 f_2}{2V_a} \qquad \text{Eq. 4}$$

Since the acoustic velocity ($V_a$) remains constant, the second frequency can be expressed according to the following equation:

$$f_2 = \frac{\lambda_1}{\lambda_2} f_1 \qquad \text{Eq. 5}$$

Therefore, when the second frequency ($f_2$) is equal to the product of the first frequency ($f_1$) and ratio of the first wavelength ($λ_1$) to the second wavelength ($λ_2$), the second wavelength first order beam 42 exits the acousto-optic cell 24, operating at the second frequency ($f_2$), at the predetermined angle (φ). By changing the position of the switch 26 from first position 38 to the second position 39, the beam exiting the acousto-optic cell 24, at the predetermined angle (φ), changes from the first wavelength, first order beam 40 to the second wavelength, first order beam 42 and vice versa.

For example, when the switch 26 is in the second position 39, the acousto-optic cell 24 (Model AGM-406B21, manufactured by IntraAction Corporation) operating at a second frequency ($f_2$) of about 39.55 MHz, diffracts the second wavelength ($λ_2$) of 10.55 μm into a second wavelength, first order beam 42' at an angle of about 0.0759 radians (about 4.35 degrees). This is the same angle at which the acousto-optic cell 24, operating at the first frequency ($f_1$) of 46 MHz, diffracted the first wavelength first order beam 40. The acousto-optic cell 24 also diffracts the first wavelength (λ) of 9.07 μm into a first wavelength, first order beam 40' at a third angle ($θ_3$) of about 0.0642 radians (about 3.74 degrees)

A preferred embodiment of signal controlling apparatus 59 includes a control 60, which produces a control signal along line 62 to the switch 26, thereby causing the switch 26 to alternate between the first position 38 and the second position 39. The rate at which the switch 26 alternates positions is limited by the bandwidth of the acousto-optic cell 24. Commercially available acousto-optic cells are capable of operating at 500 kHz and beyond. It is preferred that the control signal causes the switch 26 to alternate between the first and second position 38, 39 at a rate greater than 100 HZ. Alternating the position of the switch 26 at such a rate, thereby causes the acousto-optic cell 24 to emit alternating first and second beams 12, 15 at the predetermined angle (φ) at a rate greater than possible with mechanical switching techniques. It is more preferable that the control signal cause the switch 26 to alternate between the first and second position 38, 39 at a rate of at least 50 kHz. It is even more preferable that the control signal cause the switch 26 to alternate between the first and second position 38, 39 at a rate of at least 75 kHz. It is especially preferable to alternate the position of the switch 26 at a rate up to 500 kHz. Alternating the first and second positions 38, 39 of the switch 26 at such rates creates a pulsing effect such that the acousto-optic cell 24 emits alternating pulsed first and second wavelength, first order beams 40, 42' at the predetermined angle (φ).

Although the present invention describes a multiple beam diffracting apparatus 2 comprising an acousto-optic cell 24 capable of diffracting two beams at a predetermined angle (φ), the acousto-optic cell 24 is capable of diffracting more than two beams. Such a system would include an increased number of corresponding lasers, signal controllers, and switch positions. When the switch is in a position other than the first or second position, the switch would transmit an additional signal having a frequency ($f_x$), produced by the corresponding signal controller, to the acousto-optic cell 24. The additional frequency ($f_x$) would be a frequency such that the acousto-optic cell 24 would diffract an additional corresponding beam having a wavelength ($\lambda_x$) at the predetermined angle (φ). The additional frequency can be expressed according to the following formula:

$$f_x = \frac{\lambda_1}{\lambda_x} f_1 = \frac{\lambda_2}{\lambda_x} f_2 \qquad \text{Eq. 6}$$

where, $f_x$=acoustic frequency to diffract additional beam at predetermined angle (φ)

$\lambda_x$=wavelength of additional beam

Therefore, in order for the acousto-optic cell 24 to diffract additional first order beams at the predetermined angle (φ), the necessary acoustic frequency ($f_x$) must be equal to the product of the first frequency ($f_1$) and the ratio of the first wavelength ($\lambda_1$) to the wavelength ($\lambda_x$) of the additional beam; or the necessary frequency ($f_x$) must be equal to the product of the second frequency ($f_2$) and the ratio of the second wavelength ($\lambda_2$) to the wavelength ($\lambda_x$) of the additional beam. Switching between the necessary acoustic frequency ($f_x$), the first frequency ($f_1$) and the second frequency ($f_2$) changes which wavelength exits the acousto-optic cell 24 at the predetermined angle (φ).

Figure 3:
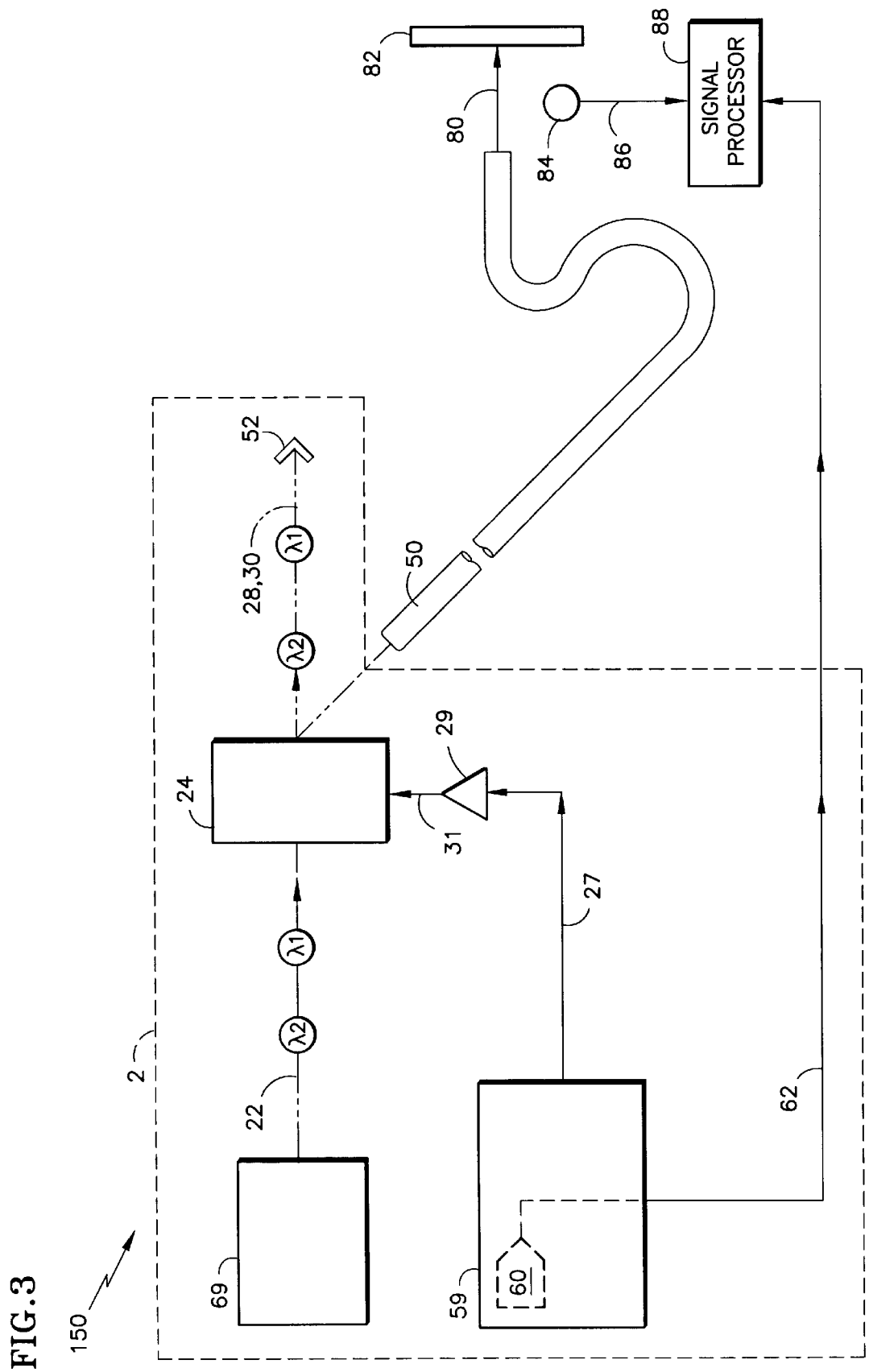
FIG. 3 is schematic diagram of a photo-acoustic leak detection system employing the multiple beam diffracting apparatus of the present invention.

Referring to FIG. 3, a further embodiment of the present invention is a photo-acoustic leak detection system 150. The photo-acoustic leak detection system 150 comprises the multiple beam diffracting apparatus 2 (discussed hereinbefore), a beam delivery device 50, an acoustic sensor 84, a signal processor 88 and a component 82 containing a gas. The beam delivery device 50 is aligned with the predetermined angle (φ), such that when the multiple beam diffracting apparatus 2 emits a beam at the predetermined angle (φ), the beam enters the beam delivery device 50. The beam delivery device 50 is a means of transmitting the beam from one location to another location. Certain types of beam delivery devices include a waveguide, an articulated arm, and a free space propagation system. Although the present invention may be used with any type of beam delivery device, the figures, herein, illustrate a waveguide as the beam delivery device. A waveguide typically includes an optical fiber, which transmits the beam from one end to the other end. Although it may be rigid, the flexible waveguide illustrated in FIG. 3 provides the capability of directing the beam 80 toward the component 82 at substantially any location and angle.

The gas is capable of absorbing the first beam 12 but is incapable of absorbing the second beam 15. For example, a tracer gas, such as sulfur hexafluoride ($SF_6$), does not absorb the first beam 12 having a wavelength about a 9.07 μm, but the tracer gas absorbs the second beam 15 having a wavelength of about a 10.55 μm wavelength. A refrigerant, however, absorbs a wavelength of about 9.07 μm, but does not absorb a wavelength of about 10.55 μm. Selection of the 9.07 μm and 10.55 μm wavelengths, therefore, allows one leak detection system to be used for determining the existence of both refrigerants and sulfur hexafluoride.

When the switch 26 is in the first position 38, the acousto-optic cell 24 directs the first beam 12 into the beam delivery device 50, which, in turn, emits a beam 80, containing first wavelength ($\lambda_1$). The beam 80, containing the first wavelength ($\lambda_1$), contacts the component 82 being tested for leaks and any leaking gas. Upon such contact, the component 82 produces a first acoustic signal indicative of the background noise. An acoustic sensor 84, such as a microphone, senses the first acoustic signal and produces a first sensor signal along line 86 to a signal processor 88, which uses such signal as a non-leak baseline measurement.

When the switch 26 is in the second position 39, the acousto-optic cell 24 directs the second wavelength ($\lambda_2$) into the beam delivery device 50 which emits a beam 80, containing second wavelength ($\lambda_2$). The beam 80, containing the second wavelength ($\lambda_2$), contacts the component and any leaking gas. The gas and the component absorb the beam 80 upon such contact and produce a second acoustic signal. The acoustic sensor 84 senses the second acoustic signal and produces a second sensor signal along line 86 to the signal processor 88. It is also preferred that the control 60, within the signal controlling apparatus 59, deliver a synchronization signal along line 62 to the signal processor 88, thereby synchronizing the first and second beams 12, 15 with their respective acoustic signals. The signal processor 88 uses the first sensor signal as a non-leak baseline measurement and subtracts the first sensor signal from the second sensor signal and produces an output signal indicative of whether a leak exists.

Figure 4:
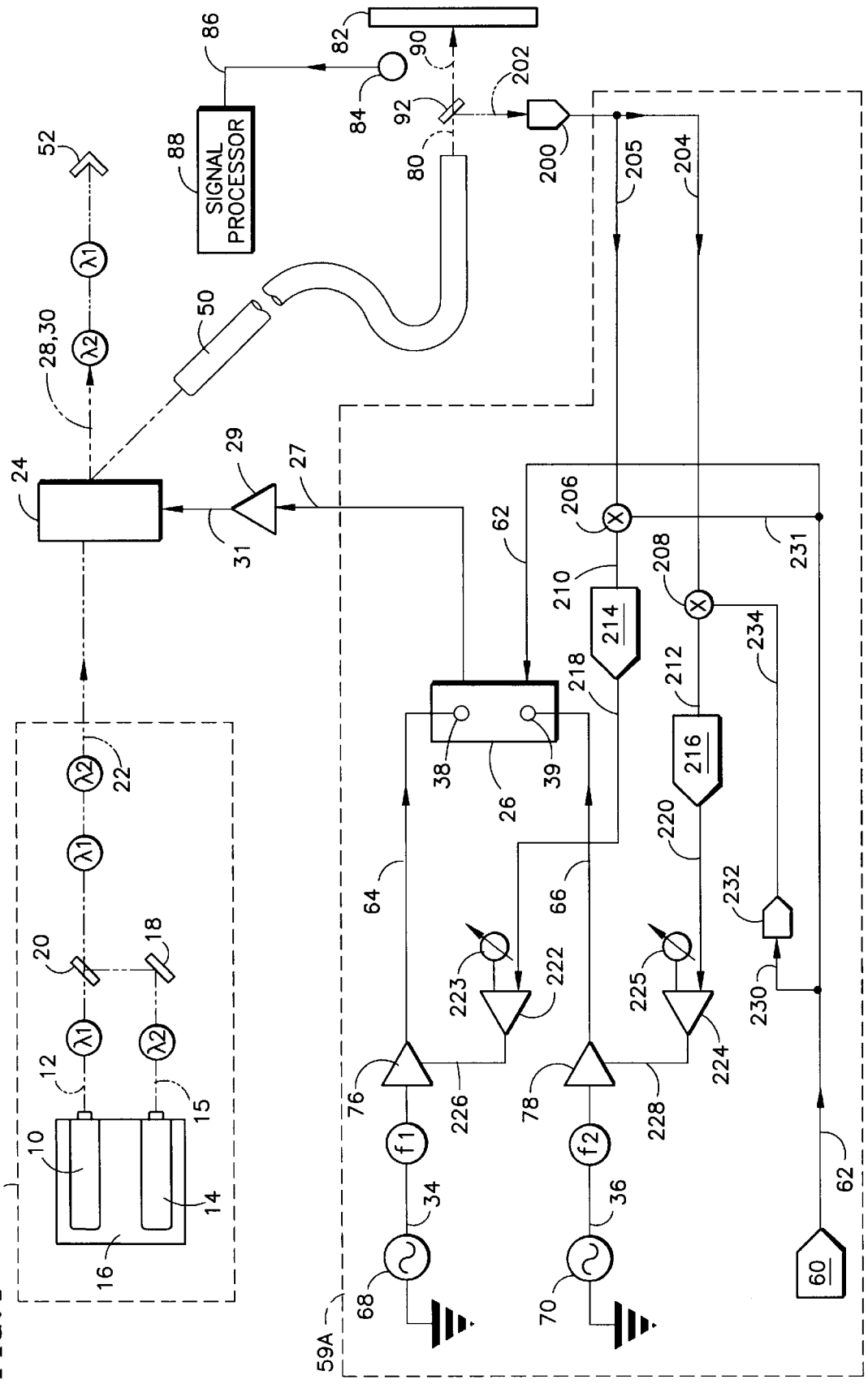
FIG. 4 is a schematic diagram of a photo-acoustic leak detection system having the ability to control the power level of multiple beams exiting a beam delivery device.

Referring to FIG. 4, a further embodiment of the present invention is a system to control the power level of multiple beams exiting the beam delivery device 50. The system comprises a coincident beam source 69, an acousto-optic cell 24, an alternate embodiment of the signal controlling apparatus 59A, a beam delivery device 50, a beam splitter 92, and a beam detector 200. The coincident beam source 69, acousto-optic cell 24, and beam delivery device 50 have been discussed hereinbefore in reference to FIG. 1.

The signal controlling apparatus 59A comprises all items comprised within the signal controlling apparatus 59 illustrated in FIG. 1 and additional items which have been added to control the intensity of the beam 80 by adjusting the amplitude of the acoustic drive frequency ($f_a$). The items similar to signal controlling apparatus 59A and the signal controlling apparatus 59 have the same reference numerals. The signal controlling apparatus 59A comprises a control 60, an inverter 232, a switch 26 and corresponding first and second signal controllers 68, 70, mixers 206, 208, filters 214, 216, error detectors 222, 224, and variable amplitude sources 76, 78 (e.g., variable gain amplifier or attenuator). Although it is not necessary, it is preferred that the frequency alternating device 59A include filters 214, 216 in order to minimize any undesired electric feedback noise within the system. The filters 214, 216 may be low pass filters, band-pass filters, etc.

Regardless of whether the beam 80 contains the first wavelength ($\lambda_1$) or the second wavelength ($\lambda_2$), the beam splitter 92 splits the beam 80 into a passthrough beam 90 and a reference beam 202. For example, the beam splitter 92 splits about 99.8 percent of the beam 80 into the passthrough beam 90 and about 0.2 percent of the beam 80 into the reference beam 202. The choice of percentages at which the beam splitter 92 divides beam 80 into a passthrough beam 90 and a reference beam 202 is related to the sensitivity of the beam detector 200.

The reference beam 202 contacts a beam detector 200 which senses the power level of the reference beam 202 and produces a beam power signal, indicative of the power level of the beam 80, along line 204 to the signal controlling apparatus 59A. The beam detector 200 may be placed at other locations, such as between the acousto-optic cell 24 and the beam delivery device 50. The control system will maintain constant power at the location where the beam detector 200 is placed. For example, the beam detector 200 could be located such to control the zero order beams 28, 30. Within the signal controlling apparatus 59A, the line 204 splits into line 205 such that the first mixer 206 receives the beam power signal from line 205 and the second mixer 208 receives the beam power signal along line 204. The first and second mixers 206, 208 also continually receive the control signal, produced by the control 60. Specifically, the control 60 emits a control signal along line 62, which splits into lines 230 and 231. The switch 26 receives the control signal along line 62. The first mixer 206 receives the control signal along line 231. The inverter 232 receives the control signal along line 230 and emits an inverse control signal along line 234 to the second mixer 208.

When the control signal causes the switch 26 to be in the first position 38, the control signal prevents the second mixer 208 from emitting the beam power signal to the second filter 216. However, when the control signal causes the switch 26 to be in the first position 38, the control signal causes the first mixer 206 to advance the beam power signal to the first filter 214 along line 210. The first low pass filter 214 produces a filtered control signal, which travels along line 218 to the first error detector 222. The first error detector 222 includes a set point controller 223 which is set at a first set-point such that the power level of the beam 80, containing the first wavelength ($\lambda_1$) exiting the beam delivery device 50 is equal to a first predetermined power level. If the filtered power signal is different than the first set-point, the first error detector 222 produces a correction signal which travels along line 226 to the first variable amplitude source 76. The first variable amplitude source 76 adjusts the amplitude of frequency of the first signal and produces an adjusted first signal such that the power level of the beam 80 is equal to the first predetermined power level when the beam 80 contains the first wavelength ($\lambda_1$). The adjusted first signal travels along line 64 to the first position 38 of the switch 26. Therefore, when the switch 26 is in the first position 38, the acousto-optic cell 24 diffracts the first beam 12 at the predetermined angle ($\phi$), and the beam delivery device 50 emits the beam 80 containing the first wavelength ($\lambda_1$) at a power level equal to the first predetermined power level.

When the control signal causes the switch 26 to be in the second position 39, the control signal prevents the first mixer 206 from emitting the beam power signal to the first filter 214. However, when the control signal causes the switch 26 to be in the second position 39, the control signal causes the second mixer 208 to advances the beam power signal to the second filter 216 along line 212. The second low pass filter 216 produces a filtered control signal, which travels along line 220 to the second error detector 224. The second error detector 224 includes a set point controller 225 which is set at a second set-point such that the power level of the beam 80, containing the second wavelength ($\lambda_2$), exiting the beam delivery device 50 is equal to a second predetermined power level. If the filtered power signal is different then the second set-point, the second error detector 224 produces a correction signal which travels along line 228 to the second variable amplitude source 78. The second variable amplitude source 78 adjusts the amplitude of the frequency of the second signal and produces an adjusted second signal such that the power level of the beam 80 is equal to the second predetermined power level when the beam 80 contains the second wavelength ($\lambda_2$). The adjusted second signal travels along line 66 to the second position 39 of the switch 26. Therefore, when the switch 26 is in the second position 39, the acousto-optic cell 24 diffracts the second beam 15 at the predetermined angle ($\phi$), and the beam delivery device 50 emits the beam 80 containing the second wavelength ($\lambda_2$) at a power level equal to the second predetermined power level. When the set point controllers 223, 225 are set such that first set-point is equal to the second set-point, the beam 80 will have the same power level regardless of whether the beam 80 contains the first wavelength ($\lambda_1$) or the second wavelength ($\lambda_2$).

Figure 5:
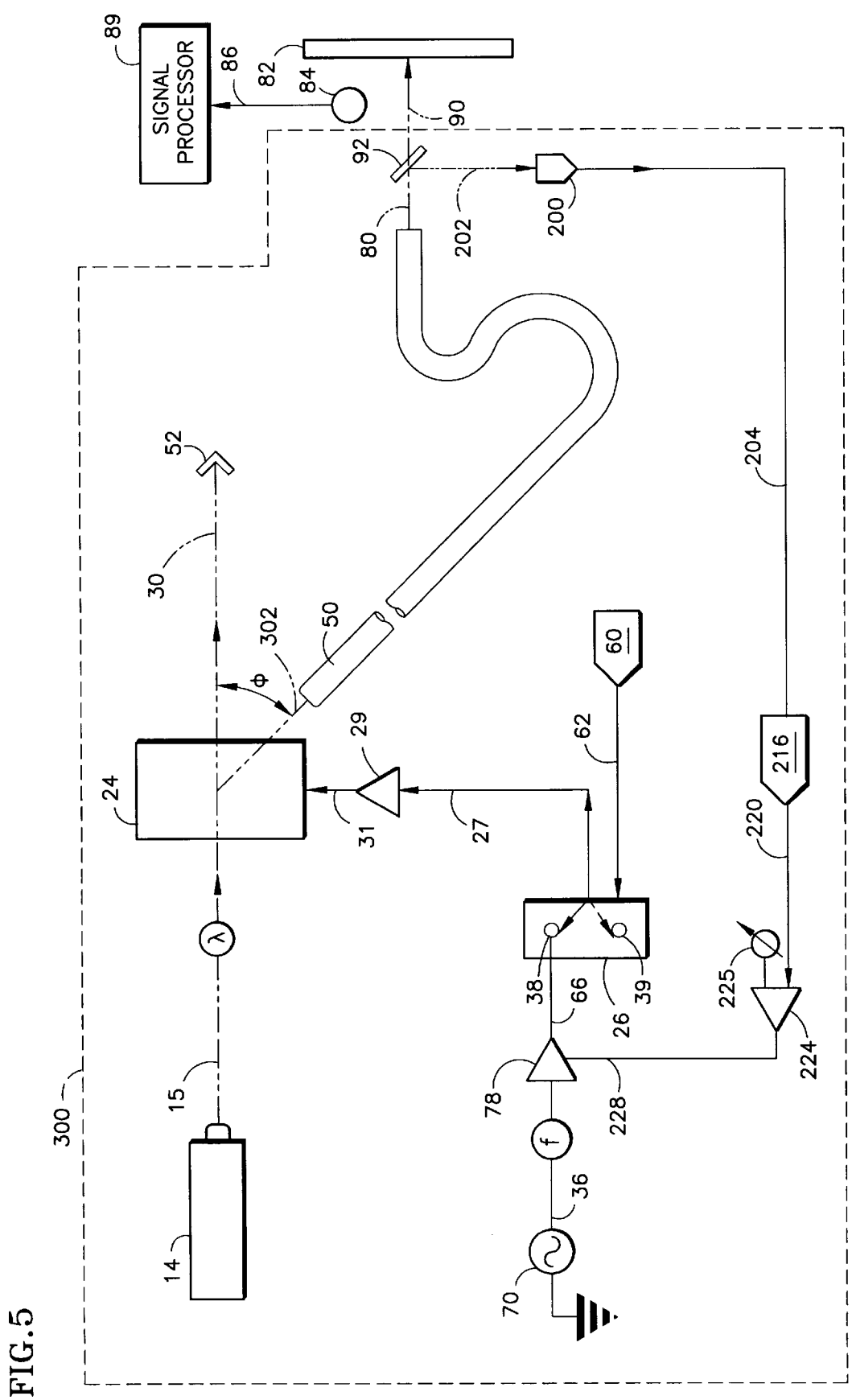
FIG. 5 is a schematic block diagram of a photo-acoustic leak detection system comprising a system to control the power level of a single beam exiting a beam delivery device.

The system to control the power level of a beam exiting a beam delivery device can also be applied to a single beam. Referring to FIG. 5, an alternate embodiment of the present invention includes a system 300 to control the power level of a beam exiting a beam delivery device. The system 300 includes a laser 14, an acousto-optic cell 24, a beam delivery device 50, a beam splitter 92, a beam detector 200, an error detector 224, a signal controller (i.e., frequency source) 70, a variable amplitude source 78, a switch 26, and a switching frequency source 60. Although it is not necessary, it is preferred that the system 300 also include a filter 216 and an amplifier 29.

The laser 14 emits a beam 15 having a wavelength ($\lambda$) which is absorbed by a gas. The beam 15 is incident on the acousto-optic cell 24. It is preferred that the beam 15 enter the acousto-optic cell 24 at an angle substantially equal to the Bragg angle ($\theta_B$) in order to maximize the power level of the first order diffracted beam exiting the acousto-optic cell 24. When the acousto-optic cell 24 fails to receive a frequency signal, the beam 15 entering the acousto-optic cell 24, exits the acousto-optic cell 24 as a zero order beam 30 which is absorbed by a beam absorber 52.

The signal controller 70 produces a signal, having a frequency ($f$), along line 36 to the variable amplitude source 78 (discussed hereinafter), which produces an amplitude adjusted signal along line 66 to switch 26. The frequency ($f$) is selected such that when the acousto-optic cell 24 operates at such frequency ($f$), the acousto-optic cell 24 diffracts the beam 15 into a first order beam 302. The first order beam 302 exits the acousto-optic cell 24 at a predetermined angle ($\phi$) and enters the beam delivery device 50.

The switch 26 has a first position 38 and a second position 39. The first position 38 of the switch 26 receives the amplitude-adjusted signal along line 66, and when the switch 26 is in the first position 38, the switch 26 emits the amplitude adjusted signal along line 27 to a RF amplifier 29. The RF amplifier 29 increases the power level of the amplitude adjusted frequency signal and emits the acoustic drive signal along line 31 to the acousto-optic cell 24. Although an RF amplifier 29 is not a necessary component of the present invention, incorporating an amplifier 29 between the switch 26 and the acousto-optic cell 24 allows the use of lower level signals at the signal controller 70, variable amplitude source 78, switch 26, beam detector 200, error detector 224, and filter 216. When the switch is in the first position 38, the first order beam 302 exits the acousto-optic cell 24 at the predetermined angle ($\phi$).

When the switch 26 is in the second position 39, the switch 26 does not emit a signal and the acousto-optic cell 24 does not operate at an acoustic drive frequency, thereby preventing the acousto-optic cell 24 from emitting a first order beam 302. The acousto-optic cell 24, rather, only diffracts the beam 15 into a zero order beam 30, wherein the zero order beam 30 exits the acousto-optic cell 24 at an angle equal to which the beam 15 is incident on the acousto-optic cell 24. Alternating the position of the switch 26 from the first position 38 to the second position 39 causes the acoustic drive frequency of the acousto-optic cell 24 to change from the amplitude adjusted frequency to no frequency, and vice versa. Furthermore, alternating the position of the switch 26 from the first position 38 to the second position 39 causes the first order beam 302 to change from a predetermined controlled amplitude to zero amplitude.

When the first order beam 302 exits the acousto-optic cell 24 at the predetermined angle ($\phi$), the first order beam 302 enters the beam delivery device 50. Alternating the position of the switch, thereby creates a pulsing effect of the first order beam 302 on the beam delivery device 50. The rate at which the first order beam 302 pulses into the beam delivery device 50 is directly related to the rate at which the switch 26 alternates from the first position 38 to the second position 39. It is preferred to create a pulse having a frequency of at least 50 kHz and even more preferred to create a pulse having a frequency of at least 75 kHz in order to minimize the amount of background noise sensed by the acoustic sensor 84. It is especially preferred to alternate the position of the switch 26 at a rate up to 500 kHz. Alternating the position of the switch 26 at such a rate allows the acousto-optic cell 24 to produce a pulsed first order beam 302 into the beam delivery device 50 at the preferred frequencies. A means of alternating the position of the switch 26 includes a control 60, which produces a control signal along line 62. The control 60 is capable of producing a control signal having a frequency of at least 50 kHz, at least 75 kHz and even up to 500 kHz, thereby alternating the switch 26 between the first and second positions 38, 39 and creating a pulsed first order beam 302 at such rates.

When the first order beam 302 exits the acousto-optic cell 24 at the predetermined angle ($\phi$) and enters the beam delivery device 50, the beam delivery device 50 emits a beam 80. If the beam 302 entering the beam delivery device 50 is constant, then the beam 80 will be constant, but if the beam 302 entering the beam delivery device 50 is pulsed, then the beam 80 will be pulsed. The beam 80, whether pulsed or constant, is incident on a beam splitter 92 capable of splitting the beam 80 into a passthrough beam 90 and a reference beam 202. For example, the beam splitter 92 splits about 99.8 percent of the beam 80 into the passthrough beam 90 and about 0.20 percent of the beam 80 into the reference beam 202. Other beam splitters capable of splitting the beam 80 may be used depending upon the sensitivity of the beam detector 200.

The passthrough beam 90 is incident on at least a portion of the component 82 which contains the gas capable of absorbing the passthrough beam 90. If any of the gas is leaking from the component 82, acoustic waves will propagate from the point at which the leaking gas is illuminated by the passthrough beam 90, due to the photo-acoustic effect discussed hereinbefore in the Background Art section hereof. The frequency at which the acoustic waves are produced is the same frequency of the control signal. A sensor 84, such as microphone, senses the acoustic waves and provides a sensor signal along line 86. Other sensors may be used, provided the sensor 84 is capable of detecting the acoustic waves. The signal processor 89 accepts the sensor signal along line 86 and determines whether or not a leak exists and/or the location and/or amount of the gas leak and provides an output signal indicative thereof. For example, if the sensor signal is greater than a predetermined low level, then the signal processor will produce an output signal indicating that a leak exists.

The reference beam 202 enters the beam detector 200, which produces a power signal indicative of the power level of the beam 80 exiting the beam delivery device 50. The power signal exits the beam detector 200 along line 204 and enters a filter 216. The filter 216 attenuates the power signal and provides a filtered power signal along line 220. Although the filter 216 is not required, it is preferred that the system 300 include a filter 216 which may be a low-pass filter or a bandpass filter, or any other filter capable of attenuating or blocking frequencies outside the desired passband.

The error detector 224, which includes a set-point controller 225, receives the filtered power signal along line 220. The set-point controller 225 is set at a level indicative of a predetermined power level, such that when the beam 80 exits the beam delivery device 50, the beam 80 has a power level substantially equivalent to the predetermined power level. The error detector 224 compares the filtered power signal to the set-point and provides a correction signal, indicative of the difference between the filtered power signal and the set-point, along line 228.

The variable amplitude source 78 receives the correction signal along line 228. The variable amplitude source 78 also receives the frequency signal along line 36 (discussed hereinbefore). Upon receiving the correction signal, the variable amplitude source 78 adjusts the amplitude of the signal and provides an amplitude adjusted signal such that when the acousto-optic cell operates at such frequency, the beam 80, exiting the beam delivery device 50, has a power level substantially equal to the predetermined power level. The variable amplitude source 78 emits the amplitude adjusted frequency along line 66 to the first position 38 of the switch 26, thereby causing the switch 26 to emit the amplitude adjusted frequency signal along line 27 when the switch 26 is in the first position 38. The acousto-optic cell 24, thereby emits a first order beam 302 at the predetermined angle ($\phi$) such that the first order beam 302 enters the beam delivery device 50 and the beam 80 exiting the beam delivery device 50 exits having a controlled predetermined power level.

The present invention represents a significant improvement over the prior art because the present invention creates a beam, having a constant power level, which can be utilized in a leak detection system. The present invention also produces alternating multiple beams having equal and/or predetermined constant power levels when each beam alternately exits the acousto-optic cell at a common location. Furthermore, the consistency of power levels can be maintained even though these beams have different wavelengths and alternate at such a high rate. Unlike the prior art, the present invention maintains the power level of the beam exiting the beam delivery device by adjusting the amplitude of the frequency signal. Incorporating the present invention within a leak detection system allows an operator to maneuver a beam delivery device in areas of limited access and obtain truly indicative acoustic signals used in determining whether a leak exists in the component, thereby increasing the accuracy and sensitivity of the leak detection system. Although the invention has been described and illustrated with respect to the exemplary embodiments thereof, it should be understood by those skilled in the art that the foregoing and various other changes, omissions and additions may be made without departing from the spirit and scope of the invention.

We claim:

1. A system for controlling the power level of a beam exiting an acousto-optic cell, comprising:
   (a) an acousto-optic cell capable of operating at a range of frequencies and diffracting at least one beam;
   (b) a beam splitter which receives and splits said beam into a passthrough beam and a reference beam;
   (c) a beam detector which receives said reference beam and produces a power signal indicative of the power level of said beam upon exiting said acousto-optic cell;
   (d) an error detector which receives said power signal, said error detector having a set-point controller set at a set-point corresponding to a predetermined power level, said error detector producing a correction signal indicative of the difference between said set-point and said power signal;
   (e) a signal controller producing a signal having a frequency and an amplitude; and
   (f) a variable amplitude source receiving said frequency signal and said correction signal and producing an amplitude adjusted signal such that when said acousto-optic cell receives said amplitude adjusted signal, said acousto-optic cell operates at said frequency and diffracts said beam at a predetermined angle having said predetermined power level.

2. The system of claim 1 further comprising a switch having a first position and a second position such that when said switch is in said first position, said acousto-optic cell receives said amplitude adjusted signal and operates at said frequency, and when said switch is in said second position said acousto-optic cell does not receive said amplitude adjusted signal.

3. The system of claim 2 further comprising a control producing a control signal which causes said switch to alternate between said first position and said second position.

4. The system of claim 3 wherein said control signal causes said switch to alternate between said first and second position at rate of at least 50 kHz.

5. The system of claim 3 wherein said control signal causes said switch to alternate between said first and second position at rate of at least 75 kHz.

6. The system of claim 3, wherein said control signal causes said switch to alternate between said first and said second positions at a rate greater than 100 Hz.

7. The system of claim 3 wherein said control signal causes said switch to alternate between said first and second position at a rate up to 500 kHz.

8. The system of claim 1 further comprising a filter between said beam detector and said error detector, said filter receiving said power signal and producing a filtered power signal.

9. The system of claim 1 further comprising an amplifier between said variable amplitude source and said acousto-optic cell, said amplifier increasing the amplitude of said amplitude adjusted signal and producing an acoustic drive signal such that when said acousto-optic cell operates at the corresponding acoustic drive frequency, said beam exits said acousto-optic cell at said predetermined angle having said predetermined power level.

10. A system for controlling the power level of a beam exiting a beam delivery device, comprising:
    (a) an acousto-optic cell capable of operating at a range of frequencies and diffracting at least one beam;
    (b) a beam delivery device capable of receiving and transmitting said beam, said beam having a power level upon exiting said beam delivery device;
    (c) a beam splitter which receives and splits said beam into a passthrough beam and a reference beam;
    (d) a beam detector which receives said reference beam and produces a power signal indicative of the power level of said beam upon exiting said beam delivery device;
    (e) an error detector which receives said power signal, said error detector having a set-point controller set at a set-point corresponding to a predetermined power level, said error detector producing a correction signal indicative of the difference between said set-point and said power signal;
    (f) a signal controller producing a signal having a frequency and an amplitude; and
    (g) a variable amplitude source receiving said signal and said correction signal and producing an amplitude adjusted signal such that when said acousto-optic cell receives said amplitude adjusted signal, said acousto-optic cell operates at said frequency and diffracts said beam at a predetermined angle, said beam entering said beam delivery device and exiting said beam delivery device having said predetermined power level.

11. The system of claim 10 wherein the beam delivery device is a waveguide.

12. The system of claim 10 wherein the beam delivery device is an articulated arm.

13. The system of claim 10 wherein the beam delivery device is a free space propagation system.

14. A method of controlling the power level of a beam exiting an acousto-optic cell, comprising the steps of:
    (a) introducing a signal, having a frequency and an amplitude, to an acousto-optic cell such that said acousto-optic cell operates at said frequency;
    (b) introducing a beam into said acousto-optic cell which diffracts said beam at a predetermined angle;
    (c) detecting the power level of the beam exiting said acousto-optic cell;
    (d) producing a power signal indicative of the power level of the beam exiting said acousto-optic cell;
    (e) comparing said power signal to a predetermined power level using an error detector and producing an error signal indicative of the difference between said power signal and said predetermined power level; and
    (f) providing a variable amplitude source with said error signal, said variable amplitude source producing an amplitude adjusted signal such that when said acousto-optic cell receives said amplitude adjusted signal, said acousto-optic cell operates at said frequency and diffracts said beam at said predetermined angle having said predetermined power level.

15. The method of claim 14 comprising the further step of switching between introducing said signal to said acousto-optic cell and failing to introduce said signal to said acousto-optic cell.

16. The method of claim 15 wherein the switching occurs at a rate of at least 50 kHz.

17. The method of claim 15 wherein the switching occurs at a rate of at least 75 kHz.

18. The method of claim 15, wherein the switching occurs at a rate greater than 100 Hz.

19. The method of claim 15 wherein the switching occurs at a rate up to 500 kHz.

20. A method of controlling the power level of a beam exiting a beam delivery device, comprising the steps of:
(a) introducing a signal, having a frequency and an amplitude, to an acousto-optic cell such that said acousto-optic cell operates at said frequency;
(b) introducing a beam into said acousto-optic cell which diffracts said beam at a predetermined angle, said beam entering a beam delivery device which transmits said beam;
(c) detecting the power level of the beam exiting said beam delivery device;
(d) producing a power signal indicative of the power level of the beam exiting said beam delivery device;
(e) comparing said power signal to a predetermined power level using an error detector and producing an error signal indicative of the difference between said power signal and said predetermined power level; and
(f) providing a variable amplitude source with said error signal, said variable amplitude source producing an amplitude adjusted signal such that when said acousto-optic device receives said amplitude adjusted signal, said acousto-optic cell operates at said frequency and diffracts said beam at said predetermined angle into said beam delivery device which emits said beam having said predetermined power level.

21. A photo-acoustic leak detection system for detecting a gas leaking from a component, comprising:
(a) a laser producing a beam having a wavelength which the gas absorbs;
(b) an acousto-optic cell capable of operating at a range of frequencies and diffracting said beam;
(c) a beam delivery device which receives, transmits and directs said beam at the component, said beam having a power level upon exiting said beam delivery device;
(d) a beam splitter located between said beam delivery device and the component, said beam splitter receiving and splitting said beam into a passthrough beam and a reference beam;
(e) a beam detector which receives said reflected beam and produces a power signal indicative of the power level of said beam upon exiting said beam delivery device;
(f) an error detector which receives said power signal, said error detector having a set-point controller set at a set-point corresponding to a predetermined power level, said error detector producing a correction signal indicative of the difference between said set-point and said power signal;
(g) a signal controller producing a signal having a frequency and an amplitude, said frequency selected such that when said acousto-optic cell operates at said frequency, said acousto-optic cell diffracts said beam at a predetermined angle and into the beam delivery device;
(h) a variable amplitude source receiving said signal and said correction signal and producing an amplitude adjusted signal such that when said acousto-optic cell receives said amplitude adjusted signal, said beam exits said beam delivery device having said predetermined power level;
(i) an acoustic sensor which receives a photo-acoustic signal upon said beam contacting the leaking gas, said acoustic sensor producing a sensor signal indicative of said photo-acoustic signal; and
(j) a signal processor which receives said sensor signal and produces an output signal indicative of a leak in the component.

22. The system of claim 21 further comprising a switch having a first position and a second position such that when said switch is in said first position, said acousto-optic cell receives said amplitude adjusted signal and when said switch is in said second position said acousto-optic cell fails to receive said amplitude adjusted signal.

23. The system of claim 22 further comprising a control producing a control signal which causes said switch to alternate between said first position and said second position.

24. The system of claim 23 wherein said switching signal causes said switch to alternate between said first and second position at rate of at least 50 kHz.

25. The system of claim 23 wherein said switching signal causes said switch to alternate between said first and second position at rate of at least 75 kHz.

26. The system of claim 23, wherein said switching signal causes said switch to alternate between said first and second positions at a rate greater than 100 Hz.

27. The system of claim 23 wherein said switching signal causes said switch to alternate between said first and second position at a rate up to 500 kHz.

28. A system for controlling the power level of a plurality of beams exiting an acousto-optic cell, comprising:
(a) an acousto-optic cell capable of operating at a range of frequencies and diffracting a plurality of beams, each having a wavelength, coincident thereon;
(b) a beam splitter which receives and splits one of said beams exiting said acousto-optic cell into a passthrough beam and reference beam;
(c) a beam detector which receives said reference beam and produces a power signal indicative of the power level of beam upon exiting said acousto-optic cell; and
(d) a signal controlling apparatus which receives said power signal, said signal controlling apparatus comprising:
(1) a first signal controller producing a first signal having a first frequency;
(2) a second signal controller producing a second signal having a second frequency;
(3) a switch having a first position and a second position;
(4) a control producing a control signal which causes said switch to alternate between said first position and said second position;
(5) a first error detector which receives said power signal when said switch is in said first position, said first error detector having a first set-point controller set at a first set-point corresponding to a first predetermined power level, said first error detector producing a first correction signal indicative of the difference between said first set-point and said power signal;
(6) a first variable amplitude source receiving said first signal and said first correction signal and producing a first amplitude adjusted signal to said switch such that when said switch is in said first position said acousto-optic cell receives said first amplitude adjusted signal and said acousto-optic cell operates at said first frequency and diffracts a first of said beams at a predetermined angle having said first predetermined power level;
(7) a second error detector which receives said power signal when said switch is in said second position, said second error detector having a second set-point controller set at a second set-point corresponding to a second predetermined power level, said second error detector producing a second correction signal indicative of the difference between said second set-point and said power signal; and (8) a second variable amplitude source receiving said second signal and said second correction signal and producing a second amplitude adjusted signal to said switch such that when said switch is in said second position said acousto-optic cell receives said second amplitude adjusted signal and said acousto-optic cell operates at said second frequency and diffracts a second of said beams at a predetermined angle having said second predetermined power level.

29. The system of claim 28 wherein said first predetermined power level is about equal to said second predetermined power level.

30. The system of claim 28 wherein said first and second predetermined power levels are set at a predetermined ratio.

31. The system of claim 28 wherein said control signal causes said switch to alternate between said first and second position at rate of at least 50 kHz.

32. The system of claim 28 wherein said control signal causes said switch to alternate between said first and second position at rate of at least 75 kHz.

33. The system of claim 28, wherein said control signal causes said switch to alternate between said first and second positions at a rate greater than 100 Hz.

34. The system of claim 28 wherein said control signal causes said switch to alternate between said first and second positions at a rate up to 500 kHz.

* * * * *